US009846699B2

(12) United States Patent
Kasterstein et al.

(10) Patent No.: US 9,846,699 B2
(45) Date of Patent: Dec. 19, 2017

(54) SYSTEM AND METHODS THEREOF FOR DYNAMICALLY UPDATING THE CONTENTS OF A FOLDER ON A DEVICE

(71) Applicant: DOAT MEDIA LTD., Tel-Aviv (IL)

(72) Inventors: Rami Kasterstein, Givataim (IL); Amihay Ben-David, London (GB); Joey Joseph Simhon, Ramat-Gan (IL)

(73) Assignee: Doat Media Ltd., Tel Aviv (IL)

(*) Notice: Subject to any disclaimer, the term of this patent is extended or adjusted under 35 U.S.C. 154(b) by 0 days.

(21) Appl. No.: 15/096,970

(22) Filed: Apr. 12, 2016

(65) Prior Publication Data

US 2016/0224586 A1    Aug. 4, 2016

Related U.S. Application Data

(63) Continuation of application No. 13/751,794, filed on Jan. 28, 2013, now Pat. No. 9,372,885, which is a
(Continued)

(51) Int. Cl.
*G06F 17/30* (2006.01)
*G06F 3/0481* (2013.01)
(Continued)

(52) U.S. Cl.
CPC ...... *G06F 17/30126* (2013.01); *G06F 3/0482* (2013.01); *G06F 3/04817* (2013.01);
(Continued)

(58) Field of Classification Search
CPC ......... G06F 17/30864; G06F 17/30867; G06F 17/30029; G06F 17/30522;
(Continued)

(56) References Cited

U.S. PATENT DOCUMENTS 5,911,043 A    6/1999  Duffy et al.
6,101,529 A    8/2000  Chrabaszcz
(Continued)

FOREIGN PATENT DOCUMENTS

EP    2288113 A1    2/2011
JP    2009278342    11/2009
(Continued)

OTHER PUBLICATIONS

Categories App Helps Organize iPhone Apps on your iPhone's Home Screen, iPhoneHacks, Oct. 5, 2008, http://www.iphonehacks.com/2008/10/categories-app.html.
(Continued)

*Primary Examiner* — Thu-Nguyet Le
(74) *Attorney, Agent, or Firm* — M&B IP Analysts, LLC (57) ABSTRACT

A system and method for dynamically updating contents of a folder on a user device. The method includes: identifying a folder on the user device as a dynamic folder; determining at least one context parameter related to the dynamic folder; searching, based on the at least one context parameter, a plurality of resources of information to identify content items that that can be pushed to the dynamic folder; and causing, for each identified content item, a display of an icon in the dynamic folder, thereby dynamically updating contents of the dynamic folder with content items found through the search.

18 Claims, 3 Drawing Sheets

Related U.S. Application Data continuation-in-part of application No. 13/712,563, filed on Dec. 12, 2012, now Pat. No. 9,141,702, which is a continuation-in-part of application No. 13/156,999, filed on Jun. 9, 2011, now Pat. No. 9,323,844, said application No. 13/712,563 is a continuation-in-part of application No. 13/296,619, filed on Nov. 15, 2011, said application No. 13/751,794 is a continuation-in-part of application No. 13/156,999, and a continuation-in-part of application No. 13/296,619.

(60) Provisional application No. 61/714,777, filed on Oct. 17, 2012, provisional application No. 61/653,562, filed on May 31, 2012, provisional application No. 61/468,095, filed on Mar. 28, 2011, provisional application No. 61/354,022, filed on Jun. 11, 2010.

(51) Int. Cl.
*G06F 3/0482* (2013.01)
*G06F 9/445* (2006.01)

(52) U.S. Cl.
CPC ............. *G06F 8/61* (2013.01); *G06F 8/65* (2013.01); *G06F 17/30106* (2013.01); *G06F 17/30115* (2013.01); *G06F 17/30424* (2013.01); *G06F 17/30598* (2013.01); *G06F 17/30864* (2013.01)

(58) Field of Classification Search
CPC ......... G06F 17/30115; G06F 17/30126; G06F 17/30424; G06F 17/30598
USPC ....................................................... 707/767
See application file for complete search history.

(56) References Cited

U.S. PATENT DOCUMENTS

| | | | |
|---|---|---|---|
| 6,484,162 B1 | 11/2002 | Edlund et al. | |
| 6,564,213 B1 | 5/2003 | Ortega et al. | |
| 6,605,121 B1 | 8/2003 | Roderick | |
| 6,727,923 B1 | 4/2004 | McInerney | |
| 7,266,588 B2 | 9/2007 | Oku | |
| 7,302,272 B2 | 11/2007 | Ackley | |
| 7,376,594 B2 | 5/2008 | Nigrin | |
| 7,461,061 B2 | 12/2008 | Aravamudan et al. | |
| 7,529,741 B2 | 5/2009 | Aravamudan et al. | |
| 7,533,084 B2 | 5/2009 | Holloway et al. | |
| 7,565,383 B2 | 7/2009 | Gebhart et al. | |
| 7,567,904 B2 | 7/2009 | Layher | |
| 7,599,925 B2 | 10/2009 | Larson et al. | |
| 7,636,900 B2 | 12/2009 | Xia | |
| 7,707,142 B1 | 4/2010 | Ionescu | |
| 7,774,003 B1 | 8/2010 | Ortega et al. | |
| 7,792,815 B2 | 9/2010 | Aravamudan et al. | |
| 7,797,298 B2 | 9/2010 | Sareen et al. | |
| 7,958,141 B2 | 6/2011 | Sundaresan et al. | |
| 7,966,321 B2 | 6/2011 | Wolosin et al. | |
| 7,974,976 B2 | 7/2011 | Yahia et al. | |
| 8,032,666 B2 | 10/2011 | Srinivansan et al. | |
| 8,073,860 B2 | 12/2011 | Venkataraman et al. | |
| 8,086,604 B2 | 12/2011 | Arrouye et al. | |
| 8,103,967 B2 | 1/2012 | Lazier et al. | |
| 8,181,102 B2 | 5/2012 | Schroeder | |
| 8,271,333 B1 | 9/2012 | Grigsby et al. | |
| 8,312,484 B1 | 11/2012 | McCarty et al. | |
| 8,392,449 B2 | 3/2013 | Pelenur et al. | |
| 8,571,538 B2 | 10/2013 | Sprigg et al. | |
| 8,572,129 B1 | 10/2013 | Lee et al. | |
| 8,606,725 B1 | 12/2013 | Agichtein et al. | |
| 8,700,804 B1 | 4/2014 | Meyers et al. | |
| 8,718,633 B2 | 5/2014 | Sprigg et al. | |
| 8,793,265 B2 | 7/2014 | Song et al. | |
| 8,799,273 B1 | 8/2014 | Chang et al. | |
| 8,825,597 B1 | 9/2014 | Houston et al. | |
| 8,843,853 B1 | 9/2014 | Smoak et al. | |
| 2003/0018778 A1 | 1/2003 | Martin et al. | |
| 2004/0186989 A1 | 9/2004 | Clapper | |
| 2004/0229601 A1 | 11/2004 | Zabawskyj et al. | |
| 2005/0071328 A1 | 3/2005 | Lawrence | |
| 2005/0076367 A1 | 4/2005 | Johnson et al. | |
| 2005/0102407 A1 | 5/2005 | Clapper | |
| 2005/0108406 A1 | 5/2005 | Lee et al. | |
| 2005/0149496 A1 | 7/2005 | Mukherjee et al. | |
| 2005/0232423 A1 | 10/2005 | Horvitz et al. | |
| 2005/0243019 A1 | 11/2005 | Fuller et al. | |
| 2005/0283468 A1 | 12/2005 | Kamvar et al. | |
| 2006/0004675 A1 | 1/2006 | Bennett et al. | |
| 2006/0031529 A1* | 2/2006 | Keith, Jr. ............ | H04L 67/1095 709/227 |
| 2006/0064411 A1 | 3/2006 | Gross et al. | |
| 2006/0129931 A1 | 6/2006 | Simons et al. | |
| 2006/0136403 A1 | 6/2006 | Koo | |
| 2006/0190439 A1 | 8/2006 | Chowdhury et al. | |
| 2006/0200761 A1 | 9/2006 | Judd et al. | |
| 2006/0206803 A1 | 9/2006 | Smith | |
| 2006/0224448 A1 | 10/2006 | Herf | |
| 2006/0224593 A1 | 10/2006 | Benton et al. | |
| 2006/0248062 A1 | 11/2006 | Libes et al. | |
| 2006/0265394 A1 | 11/2006 | Raman et al. | |
| 2006/0277167 A1 | 12/2006 | Gross et al. | |
| 2007/0011167 A1 | 1/2007 | Krishnaprasad et al. | |
| 2007/0055652 A1 | 3/2007 | Hood et al. | |
| 2007/0082707 A1 | 4/2007 | Flynt et al. | |
| 2007/0112739 A1 | 5/2007 | Burns et al. | |
| 2007/0174900 A1 | 7/2007 | Marueli et al. | |
| 2007/0195105 A1 | 8/2007 | Koberg | |
| 2007/0204039 A1 | 8/2007 | Inamdar | |
| 2007/0239724 A1 | 10/2007 | Ramer et al. | |
| 2007/0300185 A1 | 12/2007 | Macbeth et al. | |
| 2008/0065685 A1 | 3/2008 | Frank | |
| 2008/0077883 A1 | 3/2008 | Kim et al. | |
| 2008/0104195 A1 | 5/2008 | Hawkins et al. | |
| 2008/0114759 A1 | 5/2008 | Yahia et al. | |
| 2008/0256443 A1 | 10/2008 | Li et al. | |
| 2008/0306937 A1 | 12/2008 | Whilte et al. | |
| 2009/0049052 A1 | 2/2009 | Sharma et al. | |
| 2009/0070318 A1 | 3/2009 | Song et al. | |
| 2009/0077047 A1 | 3/2009 | Cooper et al. | |
| 2009/0125482 A1 | 5/2009 | Peregrine et al. | |
| 2009/0210403 A1 | 8/2009 | Reinshmidt et al. | |
| 2009/0234811 A1 | 9/2009 | Jamil et al. | |
| 2009/0234814 A1 | 9/2009 | Boerries et al. | |
| 2009/0239587 A1 | 9/2009 | Negron et al. | |
| 2009/0240680 A1 | 9/2009 | Tankovich et al. | |
| 2009/0265328 A1 | 10/2009 | Parekh et al. | |
| 2009/0277322 A1 | 11/2009 | Cai et al. | |
| 2009/0327261 A1 | 12/2009 | Hawkins | |
| 2010/0042912 A1 | 2/2010 | Whitaker | |
| 2010/0057698 A1 | 3/2010 | Kantamneni et al. | |
| 2010/0082661 A1 | 4/2010 | Beaudreau | |
| 2010/0094854 A1 | 4/2010 | Rouhani-Kalleh | |
| 2010/0106706 A1 | 4/2010 | Rorex et al. | |
| 2010/0162183 A1 | 6/2010 | Crolley | |
| 2010/0184422 A1 | 7/2010 | Ahrens | |
| 2010/0228715 A1 | 9/2010 | Lawrence | |
| 2010/0257552 A1 | 10/2010 | Sharan et al. | |
| 2010/0268673 A1 | 10/2010 | Quadracci | |
| 2010/0306191 A1 | 12/2010 | Lebeau et al. | |
| 2010/0312782 A1 | 12/2010 | Li et al. | |
| 2011/0047510 A1 | 2/2011 | Yoon | |
| 2011/0072492 A1 | 3/2011 | Mohler et al. | |
| 2011/0078767 A1 | 3/2011 | Cai et al. | |
| 2011/0093488 A1 | 4/2011 | Amacker et al. | |
| 2011/0131205 A1 | 6/2011 | Iyer et al. | |
| 2011/0225145 A1 | 9/2011 | Greene et al. | |
| 2011/0252329 A1 | 10/2011 | Broman | |
| 2011/0264656 A1 | 10/2011 | Dumais et al. | |
| 2011/0314419 A1 | 12/2011 | Dunn et al. | |
| 2012/0042272 A1 | 2/2012 | Hong et al. | |
| 2012/0052918 A1 | 3/2012 | Yang | |
| 2012/0110515 A1 | 5/2012 | Abramoff et al. | |

(56) References Cited

U.S. PATENT DOCUMENTS

| | | | |
|---|---|---|---|
| 2012/0158685 | A1 | 6/2012 | White et al. |
| 2012/0198347 | A1* | 8/2012 | Hirvonen ............ G06Q 30/0241 715/738 |
| 2013/0132896 | A1* | 5/2013 | Lee ................... G06F 17/30997 715/808 |
| 2013/0166525 | A1 | 6/2013 | Naranjo et al. |
| 2013/0219319 | A1* | 8/2013 | Park ...................... G06F 3/0488 715/775 |
| 2013/0290319 | A1 | 10/2013 | Glover et al. |
| 2014/0025502 | A1 | 1/2014 | Ramer et al. |
| 2014/0049651 | A1 | 2/2014 | Voth |
| 2014/0279013 | A1 | 9/2014 | Chelly et al. |
| 2015/0032714 | A1 | 1/2015 | Simhon et al. |

FOREIGN PATENT DOCUMENTS

| | | | |
|---|---|---|---|
| JP | 20090285550 | A1 | 11/2009 |
| JP | 2011044147 | | 3/2011 |
| KR | 20030069127 | | 8/2003 |
| KR | 20070014595 | | 2/2007 |
| KR | 20110009955 | | 1/2011 |
| KR | 1020120021925 | | 9/2012 |
| KR | 1020120012541 | A | 10/2012 |
| WO | 2007047464 | | 4/2007 |
| WO | 2009117582 | | 9/2009 |
| WO | 2010014954 | | 2/2010 |
| WO | 2011016665 | | 2/2011 |
| WO | 2012083540 | A1 | 6/2012 |

OTHER PUBLICATIONS

Currie, Brenton, Apple adds search filters, previous purchases to iPad App Store, Neowin.net, Feb. 5, 2011, http://www.neowin.net/news/apple-adds-search-filters-previous-purchases-to-ipad-app-store.

International Preliminary Report on Patentability and the Written Opinion of the International Searching Authority of PCT/US2013/023628, Korean Intellectual Property Office, Metropolitan City, Republic of Korea, dated Apr. 30, 2015.

International Searching Authority: International Search Report including "Written Opinion of the International Searching Authority" (PCT Rule 43bis.1) for the related International Patent Application No. PCT/US2011/039808; dated Feb. 9, 2012.

Miser, Brad, Using iCloud with Your iTunes Music, Apps, and Books, Informit.com, Mar. 5, 2012, http://www.informit.com/articles/article.aspx?p=1833574.

Purcell, Kevin, iOS 4.2 iPad New Features: Folders, Notebooks.com, Nov. 22, 2010, http://notebooks.com/2010/11/ios-4-2-for-ipad-new-features-folders/.

*Alice Corp v. CLS Bank International*, 573 US_, 134 S. CT. 2347 (2014).

Kurihara, et al., "How to Solve Beginner's Problem, Mac Fan Supports" Mac Fan, Mainichi Communications ooperation, Dec. 1, 2009, vol. 17, 12th issue, p. 92, Translated.

Chinese Foreign Action dated Mar. 13, 2017 from the State Intellectual Property of the P.R.C. for Chinese Patent Application: 201280004301.0, China.

Foreign Office Action for JP2015-537680 dated Dec. 6, 2016 from the Japanese Patent Office.

Kurihara, et al., "How to Solve Beginner's Problem, Mac Fan Supports" Mac Fan, Mainichi Communications cooperation, Dec. 1, 2009, vol. 17, 12th issue, p. 92.

Notice of the First Office Action for Chinese Patent Application No. 201280004300.6, State Intellectual Property Office of the P.R.C., dated Oct. 26, 2016.

Foreign Office Action for Patent Application No. 201380000403.X dated Jun. 2, 2017 by the State Intellectual Property Office of the P.R.C.

Second Office Action for Chinese Patent Application No.: 201280004300.6 dated Aug. 23, 2017, SIPO.

* cited by examiner

SYSTEM AND METHODS THEREOF FOR DYNAMICALLY UPDATING THE CONTENTS OF A FOLDER ON A DEVICE

CROSS REFERENCE TO RELATED APPLICATIONS

This application is a continuation of U.S. patent application Ser. No. 13/751,794 filed on Jan. 28, 2013, now allowed, which claims the benefit of U.S. provisional patent application No. 61/714,777 filed on Oct. 17, 2012. The Ser. No. 13/751,794 application is also a continuation-in-part application of:
- a) U.S. patent application Ser. No. 13/712,563 filed on Dec. 12, 2012, now U.S. Pat. No. 9,141,702, which claims the benefit of U.S. provisional patent application No. 61/653,562 filed May 31, 2012. The Ser. No. 13/712,563 application is a continuation-in-part of the below-referenced U.S. patent application Ser. No. 13/156,999 and Ser. No. 13/296,619;
- b) U.S. patent application Ser. No. 13/156,999 filed on Jun. 9, 2011, now allowed, which claims the benefit of U.S. provisional patent application No. 61/468,095 filed Mar. 28, 2011 and U.S. provisional application No. 61/354,022 filed Jun. 11, 2010; and
- c) U.S. patent application Ser. No. 13/296,619 filed on Nov. 15, 2011, now pending.

The contents of the above-referenced applications are incorporated herein by reference.

TECHNICAL FIELD

The present disclosure generally relates to display of applications on a device, and more specifically to techniques for adding applications to folders on a device.

BACKGROUND

The use of mobile devices and especially smart phones has significantly increased. Such mobile devices have become in many cases a primary replacement for other computing devices, allowing access by the mobile devices to data in a variety of application programs. Application programs, also known as applications or Apps, are designed to help a user of a mobile device (typically a smart phone or tablet computer) to perform specific tasks. Applications may be installed on a computing device, or may be accessible and sometimes downloadable from a web source such as, for example the AppStore®.

In order to navigate through the applications in mobile devices, a graphical user interface (GUI) is commonly used. A GUI is a type of user interface that allows users to interact with electronic devices using images rather than text commands. However, because so many applications are now available, it has become significantly more difficult to navigate through applications that are either installed on the mobile device or accessible through the web, due to the display area of the mobile device which is quite limited by nature.

To easily navigate between applications in the mobile device, the user is provided with an option to arrange the applications in folders. A creation of a folder and placing applications in a folder is performed manually by applying different gestures. For example, a user of a mobile device can tap on an icon of one application and then drag the icon onto another icon representing a different application, in order to create a folder. Thereafter, any application can be tapped and dragged to the created folder. This allows reducing the clutter on the mobile device's display. The created folder can be automatically named by the operating system of the device or manually named by the user. For example, a user can place all icons of gaming applications in one folder and name the folder "games".

However, currently available operating systems for mobile devices, such as iOS® or Android®, do not offer any solutions that either dynamically place applications in a folder or search for applications that can be included in a previously created folder. Furthermore, there is no current solution that provides any application to support such features.

It would be therefore advantageous to provide a solution that overcomes the limitations of the prior art by dynamically arranging the applications according the user's preferences.

SUMMARY

Certain embodiments disclosed herein include a method for dynamically updating contents of a folder on a user device. The method includes: identifying a folder on the user device as a dynamic folder; determining at least one context parameter related to the dynamic folder; searching, based on the at least one context parameter, a plurality of resources of information to identify content items that that can be pushed to the dynamic folder; and causing, for each identified content item, a display of an icon in the dynamic folder, thereby dynamically updating contents of the dynamic folder with content items found through the search.

Certain embodiments disclosed herein also include a system for dynamically updating contents of a folder on a user device. The system includes: a processing system; and a memory, the memory containing instructions that, when executed by the processing system, configure the system to: identify a folder on the user device as a dynamic folder; determine at least one context parameter related to the dynamic folder; search, based on the at least one context parameter, a plurality of resources of information to identify content items that that can be pushed to the dynamic folder; and cause, for each identified content item, a display of an icon in the dynamic folder, thereby dynamically updating contents of the dynamic folder with content items found through the search.

Certain embodiments disclosed herein also include a user device. The user device includes a display; a processing system; and a memory, the memory containing instructions that, when executed by the processing system, configure the user device to: identify a folder on the user device as a dynamic folder; determine at least one context parameter related to the dynamic folder; search, based on the at least one context parameter, a plurality of local resources of information to identify content items that that can be moved to the dynamic folder; and cause a display, over the display, of an icon for each identified content item in the dynamic folder, thereby dynamically updating contents of the dynamic folder with content items found through the search.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION

The embodiments disclosed herein are only examples of the many possible advantageous uses and implementations of the innovative teachings presented herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

Certain embodiments disclosed herein include a system and method for updating folders that exist on a mobile device. The system identifies a folder on the mobile device as a dynamic folder and further identifies at least one context parameter respective of the dynamic folder. Using the context parameter, a search is made locally on the user's mobile device, on the Internet, or on both locations to identify applications that can be added to the dynamic folder. One or more icons representing the one or more applications thereby found are then displayed in the dynamic folder. Such representations may be for accessing the one more applications directly or for shortcuts thereto.

An application discussed herein includes, but is not limited to, a native application (also known as "Internet mobile application") and a web application. A native application is any software application that runs on a mobile device and can, but is not required to, be accessed by using the Internet or via a connection to the Internet. Typically, a native application is installed on smart phones or tablet computers (Apps for Apple's iPhone® and iPAD®). Examples for native applications include applications that play movies, applications that download songs, applications through which a user can order a pizza, applications through which a user can request an electrician to make a house call, and the like. A web application is any application that can be accessed on the World Wide Web (WWW) via a web browser. Typically, a web application is executed by a web server and the user's device (client) receives the processing results, for example, a web application for booking flight tickets. In one embodiment, native applications and web applications are presented in the dynamic folders by using different folders.

Figure 1:
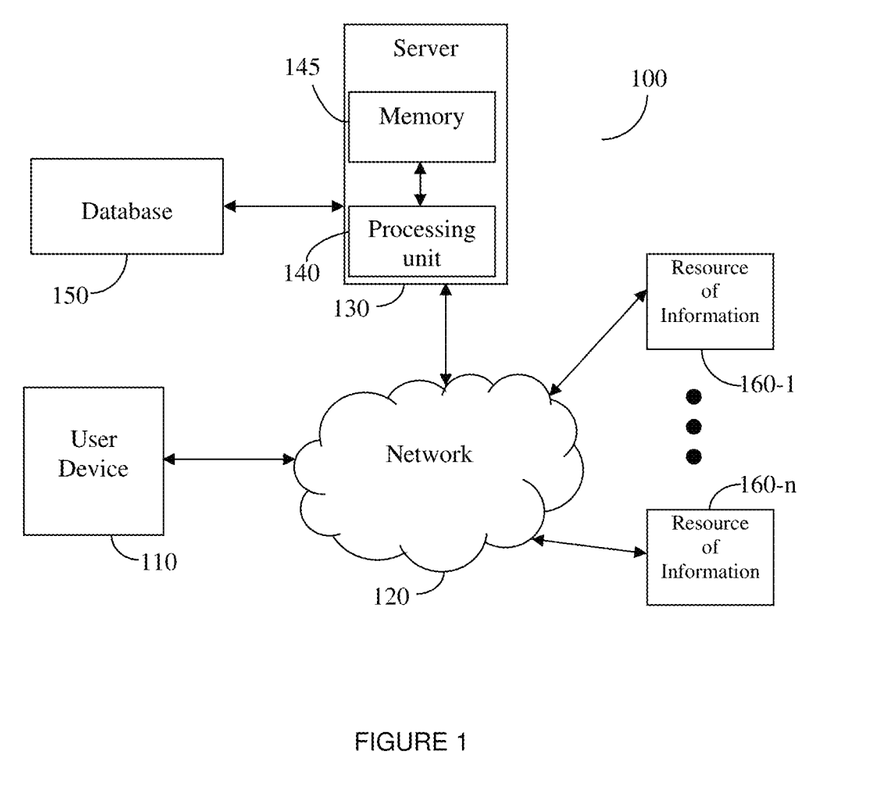
FIG. 1 is a schematic diagram of a system in accordance with an embodiment.

FIG. 1 shows an exemplary and non-limiting schematic diagram of a network system 100 utilized to describe the various embodiments disclosed herein. A user mobile device 110 such as but not limited to, a tablet computer, a smart phone, and the like, communicates with a network 120. The network 120 may be wired, wireless, cellular, a local area network (LAN), a wide area network (WAN), a metro area network (MAN), the Internet, the WWW, the like, and any combination thereof.

A server 130 identifies a folder on the user device as a dynamic folder. The identification may be made by receiving a notification from a user through the mobile device 110. In one embodiment, a definition of a dynamic folder may be a default of the folder. That is, any new folder created on the mobile device is set to be a dynamic folder. The server 130 then identifies a context parameter respective of the dynamic folder and processes the context parameter using a processing unit 140, operative by execution of instructions stored in a memory 145.

According to an exemplary embodiment, the context parameter may be, for example, the folder name. In another exemplary embodiment, the server 130 further analyzes the contents of a dynamic folder, if such contents exist, to determine the context parameter. That is, the server 130 determines to which category each application currently contained in the dynamic folder belongs, and based on the categories of most of the applications contained therein, determines the context parameters. For example, if it is determined that the majority of the applications can be categorized as gaming applications, the context parameter may be set to "games". It should be noted that the analysis may result in a folder being given a different name, for example, if the user names the folder as "play time" and the folder includes only gaming applications, the analysis performed by the server 130 would result with a context parameter equal to "games." The value of the context parameter may be set by default as the folder name provided by the user, and later when additional applications are placed therein by the user, the context parameter may be updated by the analysis performed by the users. The context parameters may be stored in a database 150 for further use.

In yet another embodiment, the identification of the context parameter, as discussed above, may be performed by an agent (not shown) or a native application installed on the mobile device 110. According to this embodiment, the identification of the context parameter may be performed offline, with no connectivity to the network 120.

Based on the at least one context parameter, the server 130 searches locally on the mobile device 110, the network 120, or both the device 110 and network 120, for applications that can be added to the dynamic folder. The server 130 then generates icons respective of the one or more applications found. An icon may represent an application or a shortcut to an application. The server 130 then displays the one or more icons in the dynamic folder on the user's device. When the user device is not connected to the network 120, the search can only be made locally on the mobile device 110.

In another embodiment, the server 130 receives a request from the user through the mobile device 110 to add or remove icons, to and from the dynamic folder respectively. In one embodiment, the server 130 can also identify applications that are not in use or are no longer relevant and remove them from the dynamic folder unless such applications were explicitly added by the user or identified as keepers.

As shown in FIG. 1 to the network 120 there are connected a plurality of resources 160-1 through 160-n. The resources 160 include, but are not limited to, a plurality of web search engines, servers of content providers, vertical comparison engines, servers of content publishers, and so on. The resources 160 may include "cloud-based" applications, that is, applications executed by servers in a cloud-computing infrastructure, such as, but not limited to, a private-cloud, a public-cloud, or any combination thereof. The cloud-computing infrastructure is typically realized through a data center.

According to one embodiment, the search for applications or content to be included in the dynamic folder may include selection of one or more resources 160 based on the context parameter. The search server 120 is configured to determine which resources 160-1 through 160-n would be the most appropriate resource(s) to address the users' preference for the dynamic folder respective of the at least one context parameter. A method for searching for most appropriate resource(s) is further described in the above-reference U.S. patent application Ser. No. 13/712,563.

According to another embodiment, only a local search for applications already installed on the mobile device 110 is performed. The local search is performed when the mobile device 110 has no connection to the server 130 or when the server 130 cannot retrieve search results through the network. In one embodiment, the "off-line" search is performed by an application installed on the mobile device and is configured to remotely implement the tasks of the servers 130 for searching applications installed on the mobile device 110 that can be added to the dynamic folder 110 based on the at least one context parameter.

Figure 2:
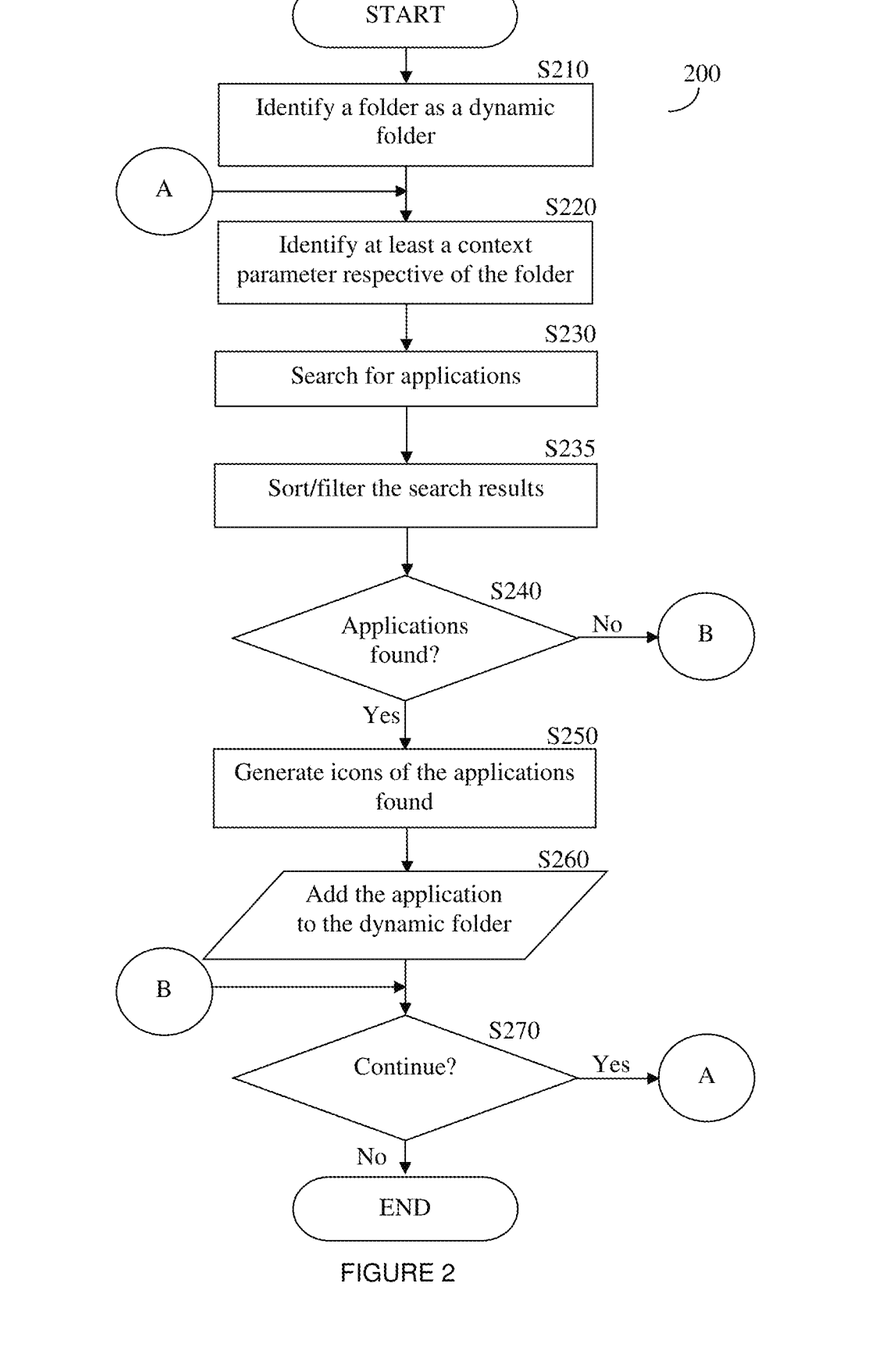
FIG. 2 is a flowchart describing the operation of the system for updating a dynamic folder on a device in accordance with an embodiment; and, FIG. 3 is a screenshot of a screen of a mobile device displaying the updating of a dynamic folder on a device in accordance with an embodiment.

FIG. 2 depicts an exemplary and non-limiting flowchart 200 of a method for updating dynamic folders on a user's device according to one embodiment. In S210, a folder on a user device, for example, the mobile device 110 is identified as a dynamic folder by the server 130. Such identification may be made respective of the settings on the mobile device 110.

In S220, at least one context parameter respective of the dynamic folder is identified. The context parameter may be set, for example, based on the name of the dynamic folder, the contents of the dynamic folder, and so on. In such cases where the name of a folder is automatically assigned by the user device's operating system or by the user of the device 110, the server 130 is configured to check if the assigned name correlates to the dynamic folder's contents. If the assigned name does not correlate, an appropriate name is determined by the server 130. As noted above, such a determination may be based on the category of each application in the dynamic folder that uniquely identifies the stored application.

In S230, respective of at least the context parameter, a search is performed by the server 130 for one or more applications that can be added to the dynamic folder. The search can be performed locally on the mobile device 110, in the network 120, for resources 160, or any combination thereof. In one embodiment, searching the network 120 may include searching central repositories of applications designed for mobile devices. For example, the search can be performed in AppStore®, GooglePlay®, MS Store, a cooperative repository, and the like. The search may include querying one or more repositories with the context parameter. A search for resources 160 is performed by the server 130 to select the most appropriate resource(s) to address the users' preference for the dynamic folder respective of the at least one context parameter. A search on the mobile device 110 is performed to find applications locally installed on the mobile device 110 that can be added to the dynamic folder. As noted above, the local search can also be performed when the mobile device 110 has no active connection with the server 130.

Optionally, at S235, the search results, i.e., the applications and/or resources 160 returned by the search may be sorted and/or filtered to provide the most appropriate applications to the user. In one embodiment, the filtering and/or sorting is performed using at least one external parameter. The external parameter characterizes at least one of: a user of the mobile device and the user's device. The external parameter may include, but is not limited to, demographic information respective of the user, a location of the mobile device, type of the operating system of the device, and the like. For example, if the external parameter includes the user's age, then age-restricted applications found by the search (S230) can be filtered. As another example, if the operating system of the mobile device is iOS®, applications that are incompatible with this type of operating system will be filtered out. The external parameter may be received from the mobile device and external databases (e.g., the database 150).

In S240, it is checked whether at least one application is found, and if so, execution continues with S250; otherwise, execution continues with S270. According to another embodiment, it is further checked in S240, whether the user added at least one application to the dynamic folder. Such an application could be considered as part of the dynamic folder.

In S250, one or more icons respective of the one or more applications found are generated. In S260, the one or more icons respective of the one or more applications are displayed in the folder on the user's device. In one embodiment, web applications may be represented by a different icon than the native applications, for example, as round icons. It should be noted that an icon may be any type of graphical symbol rendered and displayed over the display of the user device. Clicking or tapping on the icon activates the respective application or provides a link to an information resource (e.g., a news website), thereby providing the user with the desired information and/or action. In one embodiment, an icon may be in a form of a widget or a gadget that can activate and/or provide a link to a respective resource on the web. It should be noted that the widget or gadget is associated with an application selected as described in detail above. In an embodiment, prior to placing the icons in the dynamic folder, the server 130 requests the user to authorize or authenticate the placement in order to complete the operation.

In S270, it is checked whether additional folders identified by the server 130 are to be added to the dynamic folder, and if so, execution continues with S220; otherwise, execution terminates.

Figure 3:
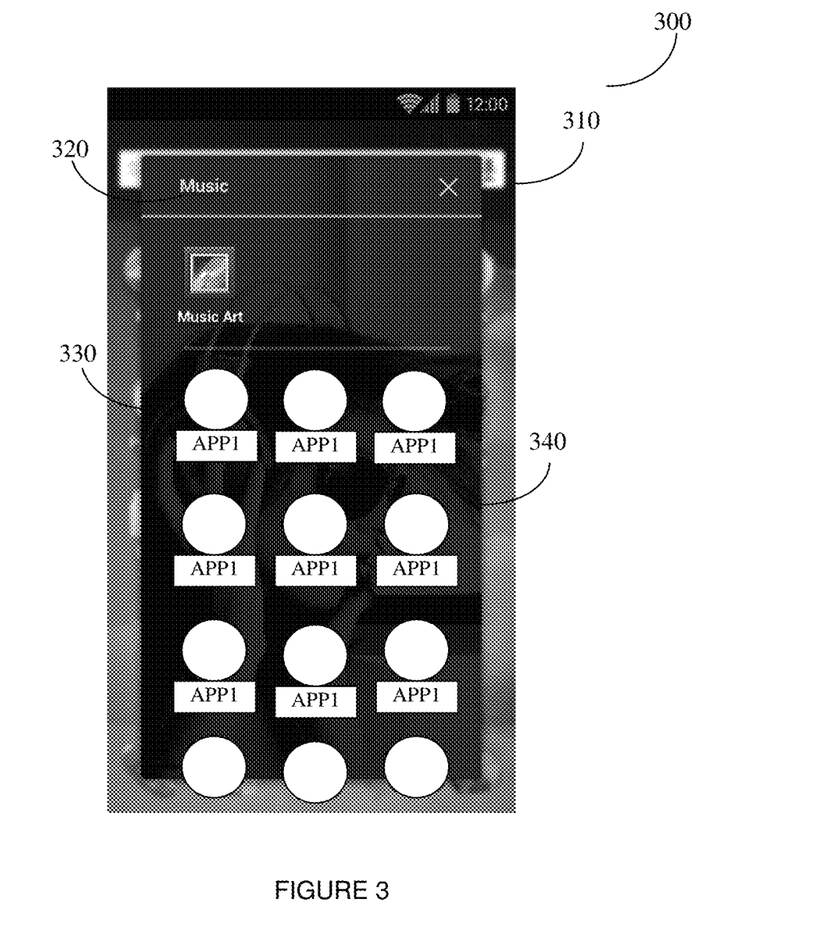

FIG. 3 shows an exemplary and non-limiting screenshot 300 of a screen of a typical mobile device 310. A user enters the dynamic folder's name, in window 320. If a user enters, for example, the term "Music" as the dynamic folder's name, the server 130 searches for applications that can be added to the dynamic folder, locally and/or on the network (e.g., the Internet). The server 130 then displays icons 330 representing applications in a dynamic folder 340 on the mobile device 310.

According to this embodiment, web applications are represented by round icons. In one embodiment, instant wallpaper is displayed in the dynamic folder 340 background with one or more pictures respective of the dynamic folder's name. The display of instant wallpaper is explained in greater detail in the above-referenced patent application Ser. No. 13/296,619 titled "A System and Methods Thereof for Instantaneous Updating of a Wallpaper Responsive of a Query Input and Responses Thereto" filed on Nov. 15, 2011, the contents of which are hereby incorporated by reference.

In one embodiment, the order of appearance of the applications in the folder is changeable respective of the user selection. According to another embodiment, the server 130 can receive a selection of one or more applications from the user to be displayed in a folder. In yet another embodiment, the server 130 allows the creation of sub-folders that match the dynamic folder's name or the dynamic folder's content. For example, a folder named "Games" may comprise sub folders, such as "Puzzles" and "Trivia", or other sub folders subject to the user's selection.

It should be appreciated that the embodiments disclosed herein allow searching for applications of interest to a user of the mobile device without even having the user provide a query for the search. That is, merely by creating a folder on a mobile device and configuring such a folder as a dynamic folder, the disclosed embodiments populate such a folder with applications that are of an interest of the user. Furthermore, the disclosed embodiments allow placing already installed applications on the user device without any interaction from the user.

The various embodiments disclosed herein can be implemented as hardware, firmware, software, or any combination thereof. Moreover, the software is preferably implemented as an application program tangibly embodied on a program storage unit or tangible computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. All or some of the servers may be combined into one or more integrated servers. Furthermore, a non-transitory computer readable medium is any computer readable medium except for a transitory propagating signal. The display segments and mini-display segments may be shown on a display area that can be a browser or another other appropriate graphical user interface of an internet mobile application, either generic or tailored for the purposes described in detail hereinabove.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for dynamically updating contents of a folder on a user device, comprising:
    identifying a folder on the user device as a dynamic folder;
    determining a category of each of at least one content item already existing in the dynamic folder;
    determining at least one context parameter related to the dynamic folder, wherein the at least one context parameter is determined based on the determined categories;
    searching, based on the at least one context parameter, a plurality of resources of information to identify content items that can be pushed to the dynamic folder; and
    causing, for each identified content item, a display of an icon in the dynamic folder, thereby dynamically updating contents of the dynamic folder with content items found through the search.

2. The method of claim 1, further comprising:
    receiving at least one external parameter; and
    filtering the identified content items based on the at least one external parameter.

3. The method of claim 2, wherein the external parameter characterizes at least one of: a user of the user device, and the user device.

4. The method of claim 1, wherein the at least one context parameter is determined based further on a name of the dynamic folder.

5. The method of claim 1, wherein each identified content item is at least any of: a native mobile application, a virtual application, and a web application.

6. The method of claim 5, wherein each icon is any of: a graphical symbol, a widget, and a gadget that causes either activation of the respective application or installation of the respective application on the user device.

7. The method of claim 1, wherein the plurality of resources of information are at least one of: remotely connected to the user device, and locally included in the user device.

8. The method of claim 1, wherein the identification of the context parameter is performed offline when the user device is not connected to a network.

9. A non-transitory computer readable medium having stored thereon instructions for causing one or more processing units to execute the method according to claim 1.

10. A system for dynamically updating contents of a folder on a user device, comprising:
    a processing system; and
    a memory, the memory containing instructions that, when executed by the processing system, configure the system to:
    identify a folder on the user device as a dynamic folder;
    determine a category of each of at least one content item already existing in the dynamic folder;
    determine at least one context parameter related to the dynamic folder, wherein the at least one context parameter is determined based on the determined categories;
    search, based on the at least one context parameter, a plurality of resources of information to identify content items that can be pushed to the dynamic folder; and
    cause, for each identified content item, a display of an icon in the dynamic folder, thereby dynamically updating contents of the dynamic folder with content items found through the search.

11. The system of claim 10, wherein the system is further configured to:
    receive at least one external parameter; and
    filter the identified content items based on the at least one external parameter.

12. The system of claim 11, wherein each external parameter characterizes at least one of: a user of the user device, and the user device.

13. The system of claim 10, wherein the at least one context parameter is determined based further on a name of the dynamic folder.

14. The system of claim 10, wherein each identified content item is any of: a native application, a virtual application, and a web application.

15. The system of claim 14, wherein each icon is any of: a graphical symbol, a widget, and a gadget that causes either activation of the respective application or installation of the respective application on the user device.

16. The system of claim 10, wherein the plurality of resources of information are at least one of: remotely connected to the user device, and locally included in the user device.

17. The system of claim 10, wherein the identification of the context parameter is performed offline when the user device is not connected to a network.

18. A user device, comprising:
   a display;
   a processing system; and
   a memory, the memory containing instructions that, when executed by the processing system, configure the user device to:
   identify a folder on the user device as a dynamic folder;
   determine a category of each of at least one content item already exiting in the dynamic folder;
   determine at least one context parameter related to the dynamic folder, wherein the at least one context parameter is determined based on the determined categories;
   search, based on the at least one context parameter, a plurality of local resources of information to identify content items that can be pushed to the dynamic folder; and
cause a display, over the display, of an icon for each identified content item in the dynamic folder, thereby dynamically updating contents of the dynamic folder with content items found through the search.

\* \* \* \* \*